United States Patent
Brockman (10) Patent No.: US 10,482,431 B2
(45) Date of Patent: *Nov. 19, 2019

(54) VEHICLE TRACKING SYSTEMS AND METHODS

(71) Applicant: THE REYNOLDS AND REYNOLDS COMPANY, Kettering, OH (US)

(72) Inventor: Robert T. Brockman, Houston, TX (US)

(73) Assignee: THE REYNOLDS AND REYNOLDS COMPANY, Kettering, OH (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/445,648

(22) Filed: Feb. 28, 2017

(65) Prior Publication Data
US 2017/0262814 A1 Sep. 14, 2017

Related U.S. Application Data

(60) Provisional application No. 62/306,492, filed on Mar. 10, 2016.

(51) Int. Cl.
*G06Q 10/00* (2012.01)
*G06K 7/10* (2006.01)

(52) U.S. Cl.
CPC ......... *G06Q 10/20* (2013.01); *G06K 7/10366* (2013.01)

(58) Field of Classification Search
CPC .................................................. G06Q 10/20
See application file for complete search history.

(56) References Cited

U.S. PATENT DOCUMENTS

| | | | | |
|---|---|---|---|---|
| 2003/0088436 A1* | 5/2003 | Berger | ............... | G06Q 10/20 705/304 |
| 2008/0040268 A1* | 2/2008 | Corn | ............... | G06Q 10/06 705/305 |
| 2008/0228346 A1* | 9/2008 | Lucas | ............... | G06Q 10/087 701/31.4 |
| 2008/0301008 A1* | 12/2008 | DePrisco | ............... | G06Q 10/06 705/28 |
| 2010/0060452 A1* | 3/2010 | Schuster | ............... | G06Q 10/06 340/572.1 |
| 2010/0082569 A1* | 4/2010 | Cresto | ............... | G06Q 10/087 707/705 |
| 2014/0266804 A1* | 9/2014 | Asadpour | ............... | G08G 1/143 340/932.2 |

* cited by examiner

*Primary Examiner* — Dennis W Ruhl
(74) *Attorney, Agent, or Firm* — Adolph Locklar (57) ABSTRACT

A vehicle service facility may include an RFID transmitter-receiver. The RFID transmitter-receiver may include at least one RFID antenna. The RFID transmitter-receiver may further include an RFID reader. The vehicle service facility may also include a computer system, the computer system having a programmable processor such as a microprocessor or a microcontroller and processor-readable or computer-readable programming code embodying logic embedded on tangible, non-transitory computer readable media. The computer system is in data communication with the RFID reader.

13 Claims, 12 Drawing Sheets

VEHICLE SERVICE FACILITY NAME BANNER

| Type | Guest | Appt Time | Advisor | Lane Arrival | Complaint |
|---|---|---|---|---|---|
| appt | CORENE | 4:45 PM | Shelly Johnson | | CUSTOMER REQUEST TIRE ROTATION |
| appt | ARLENE | 4:45 PM | JENNIFER SIE. | | CUSTOMER REQUEST TIRE ROTATION |
| appt | NORMA | 5:00 PM | MARTHA STEE... | | |

VEHICLE SERVICE FACILITY NAME BANNER — 752

| Customer Name | Tag... | YR | Model | RO Status | Advisor Name |
|---|---|---|---|---|---|
| Townsley | 400 | 06 | FOCUS | Pending Assignment | Shelly Johnson |
| Burke | | 98 | MUSTANG | Pending Assignment | Jennifer Sieber |
| Dodd | | 04 | MAXIMA | Pending Assignment | Martha Steele |

FIG. 9

VEHICLE TRACKING SYSTEMS AND METHODS

CROSS REFERENCE TO RELATED APPLICATIONS

This application is a non-provisional application which claims priority from U.S. provisional application No. 62/306,492, filed Mar. 10, 2016, which is incorporated by reference herein in its entirety.

TECHNICAL FIELD/FIELD OF THE DISCLOSURE

The present disclosure relates to vehicle tracking and notification systems and methods and specifically to vehicle tracking and notification systems and methods for use in vehicle service facilities.

BACKGROUND OF THE DISCLOSURE

Vehicle service facilities, such as service facilities associated with automobile dealerships, use intake processes for customer vehicles. These traditional customer vehicle intake processes are frequently manually intensive, wherein the customer searches for the service advisor or a service facility employee serves as an interface between the customer and the service representative. Vehicle service facilities may also use customer notification methods. Such methods may also be manually intensive. Typically, the service representative or service facility employee locates the customer, who may or may not be on-site, to update the customer on the status of vehicle service, and, upon completion of service, process the customer through payment, such as through the cashier.

SUMMARY

The disclosure includes a vehicle service facility. The vehicle service facility may include an RFID transmitter-receiver. The RFID transmitter-receiver may include at least one RFID antenna. The RFID transmitter-receiver may further include an RFID reader. The vehicle service facility may also include a computer system, the computer system having a programmable processor such as a microprocessor or a microcontroller and processor-readable or computer-readable programming code embodying logic embedded on tangible, non-transitory computer readable media. The computer system is in data communication with the RFID reader. The vehicle service facility may include a vehicle intake bay and a service shop. The at least one RFID antenna is a vehicle intake bay antenna, a service shop entry antenna, a service shop exit antenna, or a combination thereof.

Another embodiment includes a method. The method includes detecting an RFID tag with a vehicle intake bay entry antenna and determining if the RFID tag is associated with a loaner vehicle, a vehicle having a scheduled appointment, or a vehicle associated with a walk-in customer.

Another embodiment includes a RFID vehicle tracking system. The RFID vehicle tracking system may include an RFID tag, where the RFID tag is adhered to a vehicle. The RFID vehicle tracking system also includes an RFID transmitter-receiver, the RFID transmitter-receiver including at least one RFID antenna and an RFID reader. The at least one RFID antenna is located within a service shop or a car wash. The RFID vehicle tracking system also includes a computer system, the computer system having a programmable processor such as a microprocessor or a microcontroller and processor-readable or computer-readable programming code embodying logic embedded on tangible, non-transitory computer readable media. The computer system is in data communication with the RFID reader.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
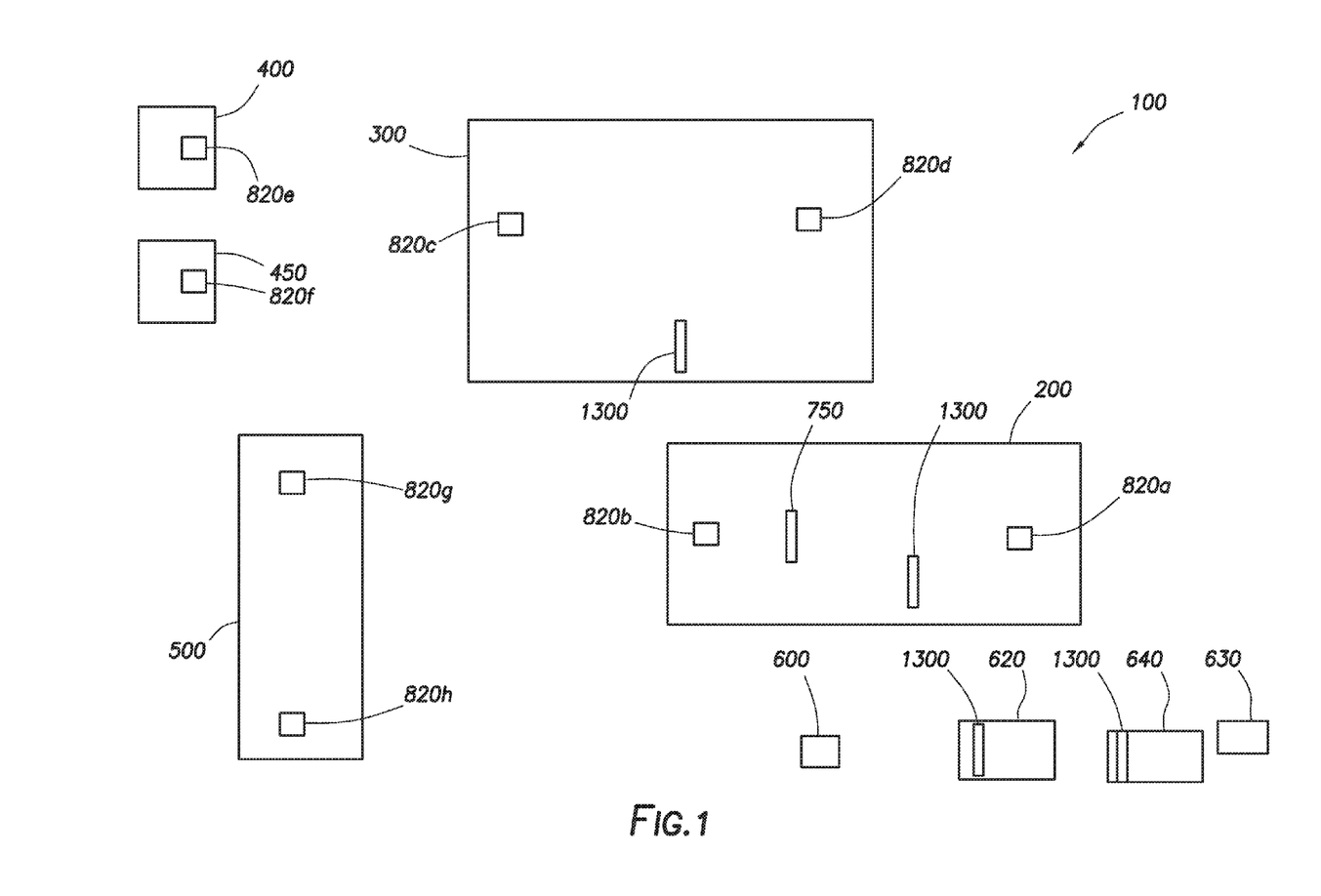
FIG. 1 is a schematic representation of a vehicle service facility consistent with certain embodiments of the present disclosure.

Certain embodiments of the present disclosure are directed to vehicle tracking and notification systems and methods for use in vehicle service facilities. FIG. 1 is a schematic representation of vehicle service facility 100 consistent with certain embodiments of the present disclosure. As depicted in FIG. 1, a non-limiting example of vehicle service facility 100 includes vehicle intake bay 200, service shop 300, first vehicle lot 400, second vehicle lot 450, and car wash 500. Vehicle intake bay 200 may receive vehicles for service and/or receive loaner vehicles. A loaner vehicle may be a vehicle provided to a customer of vehicle service facility 100 while the customer's vehicle is being serviced. Service shop 300 may be a facility for service of vehicles. Service may include, but is not limited to, routine maintenance, repair, body work, and installation of new accessories. First vehicle lot 400 and second vehicle lot 450 may be parking lots for storage of customer vehicles. FIG. 1 is a non-limiting example of vehicle service facility 100 and in certain embodiments, one or more of the following may be omitted from vehicle service facility 100: vehicle intake bay 200, first vehicle lot 400, second vehicle lot 450, and car wash 500. In the embodiment shown in FIG. 1, vehicle service facility 100 also includes cashier 600, one or more service advisors 620, and one or more porters 630. In certain embodiments, such as shown in FIG. 1, vehicle service facility 100 may also include waiting room 640 where customers may wait during vehicle service.

Figure 2:
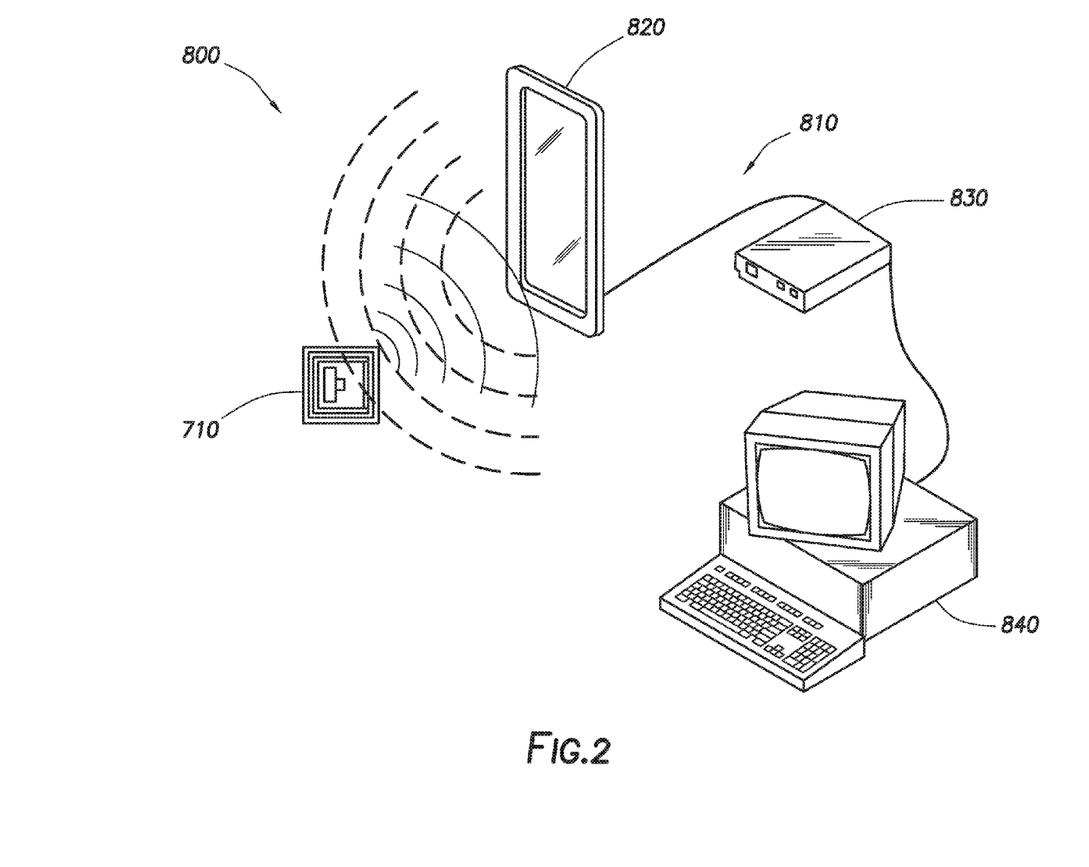
FIG. 2 is a graphic of a vehicle tracking and notification system consistent with certain embodiments of the present disclosure.

As shown in FIG. 2, vehicle tracking and notification system 800 may include a Radio Frequency Identification (RFID) tag 710 attached to a vehicle, one or more RFID transmitter-receivers 810, and computer system 840 for collecting, storing, and distributing data associated with the vehicle and its location within vehicle service facility 100. RFID tag 710 may be passive or battery powered. In the embodiment shown in FIG. 2, RFID tag 710 is passive. RFID transmitter-receiver 810 may include RFID antenna 820 and RFID reader 830. When RFID tag 710 is passive, as shown in FIG. 2, RFID transmitter-receiver transmits a radio or optical signal through RFID antenna 820 to RFID tag 710. RFID tag 170 responds with an RFID tag signal based on RFID tag information stored in RFID tag 710. RFID antenna 820 receives the RFID tag signal, which is then transferred to RFID reader 830. RFID reader 830 communicates the RFID tag information to computer system 840. Computer system 840 may include a programmable processor such as a microprocessor or a microcontroller and processor-readable or computer-readable programming code embodying logic embedded on tangible, non-transitory computer readable media.

Computer system 840 may be associated with one vehicle service facility 100 or multiple vehicle service facilities. Communication of RFID tag information to computer service 840 from RFID reader 830 may be may wirelessly or via wired connection. Wireless connections may be via RF signal, cellular signal, or over a wireless network, for example. Intermediate receiver and transmission equipment may be used to communicate from RFID reader 830 to computer system 840.

In the non-limiting embodiment shown in FIG. 2, RFID reader 830 is associated with a single RFID antenna 820. As one of ordinary skill in the art with the benefit of this disclosure will appreciate, RFID reader 830 may be associated with a plurality of RFID antennas 820. While depicted separately in FIG. 2, one of ordinary skill in the art with the benefit of this disclosure will appreciate that RFID reader 830 and RFID antenna 820 may be integrated. RFID antenna 820 and RFID reader 830 may be fixed, as shown in FIG. 2, or may be integrated into a hand-held RFID transmitter-receiver.

Figure 3:
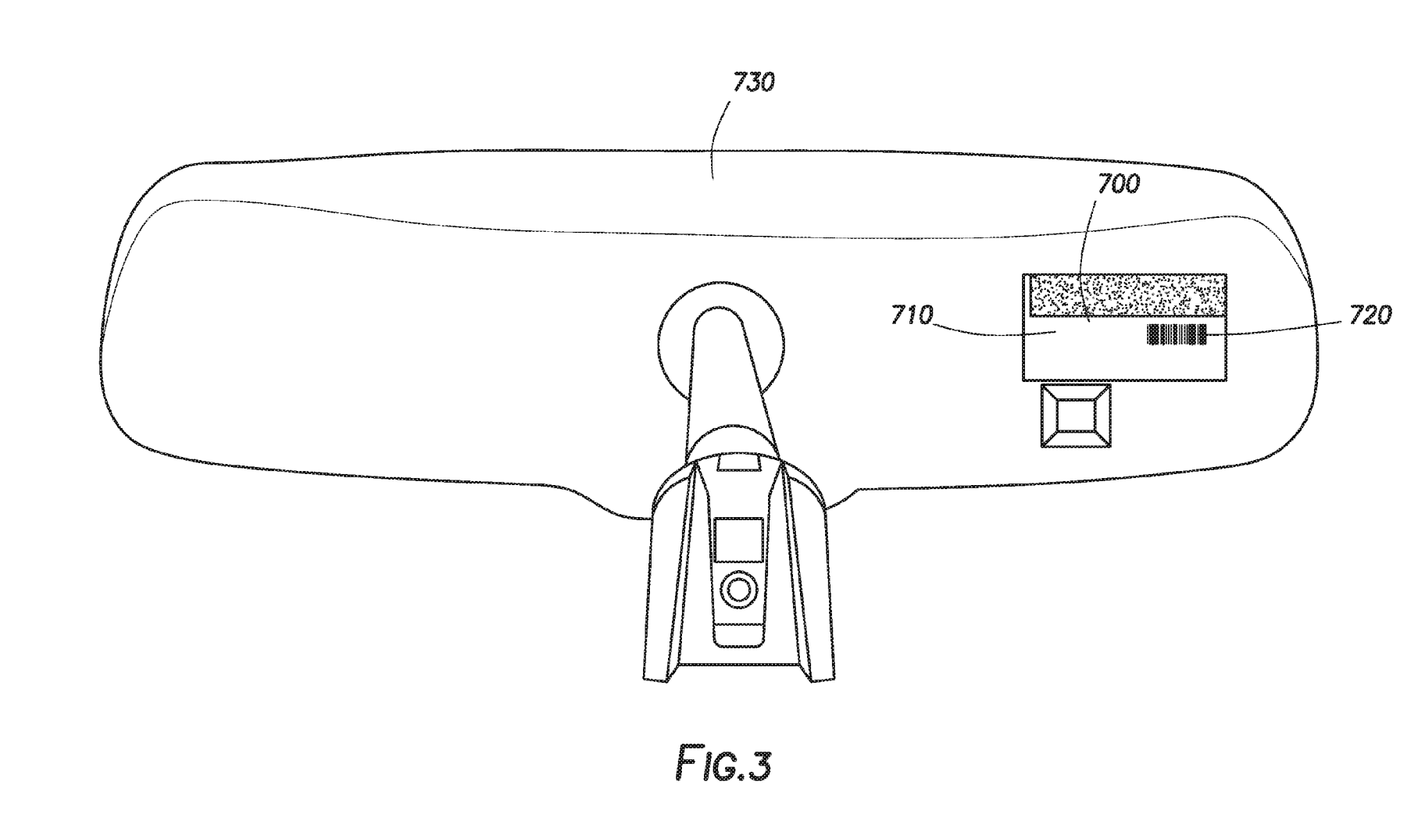
FIG. 3 is a representation of an RFID tag installed on a rear view mirror consistent with certain embodiments of the present disclosure.

RFID tag 710 may be attached to the vehicle in any manner suitable for reading by RFID transmitter-receiver 810. In one non-limiting embodiment, as depicted in FIG. 3, RFID tag sticker 700 may be adhered to the backside of rearview mirror 730. RFID tag sticker 700 may include RFID tag 710. In certain embodiments, such as the embodiment shown in FIG. 3, RFID tag sticker 700 may further include bar code 720. In certain embodiments, more than one RFID tag 710 may be attached to the vehicle. For example, more than one RFID tag 710 may be included on RFID tag sticker 700. In other embodiments, more than one RFID tag sticker 700, each including one RFID tag 710, may be attached to the vehicle.

With further attention to FIG. 1, vehicle service facility 100 may include some or all of the following RFID antennas 820: vehicle intake bay entry antenna 820a, vehicle intake bay exit antenna 820b, service shop entry antenna 820c, service shop exit antenna 820d, first vehicle lot entry antenna 820e, second vehicle lot entry antenna 820f, car wash entry antenna 820g, and car wash exit antenna 820h. Vehicle intake bay entry antenna 820a may be adapted to detect RFID tag 710 when RFID tag 710 enters vehicle intake bay 200. Vehicle intake bay exit antenna 820b may be adapted to detect RFID tag 710 when RFID tag 710 exits vehicle intake bay 200. Service shop entry antenna 820c may be adapted to detect RFID tag 710 when RFID tag 710 enters service shop 300. Service shop exit antenna 820d may be adapted to detect RFID tag 710 when RFID tag 710 exits service shop 300. First vehicle lot entry antenna 820e may be adapted to detect RFID tag 710 when RFID tag 710 enters first vehicle lot 400. Second vehicle lot antenna 820f may be adapted to detect RFID tag 710 when RFID tag 710 enters second vehicle lot 450. Car wash entry antenna 820g may be adapted to detect RFID tag 710 when RFID tag 710 enters car wash 500. Car wash exit antenna 820h may be adapted to detect RFID tag 710 when RFID tag 710 exits car wash 500.

In certain embodiments, vehicle service facility 100 may include entry or exit RFID antennas 820 without the corresponding exit or entry RFID antenna 820. For instance, car wash 500 may include car wash entry antenna 820g, while car wash exit antenna 820h may be omitted. Similarly, and without limitation, vehicle intake bay 200 may include vehicle entry bay entry antenna 820a and omit vehicle entry bay exit antenna 820b.

Figure 4:
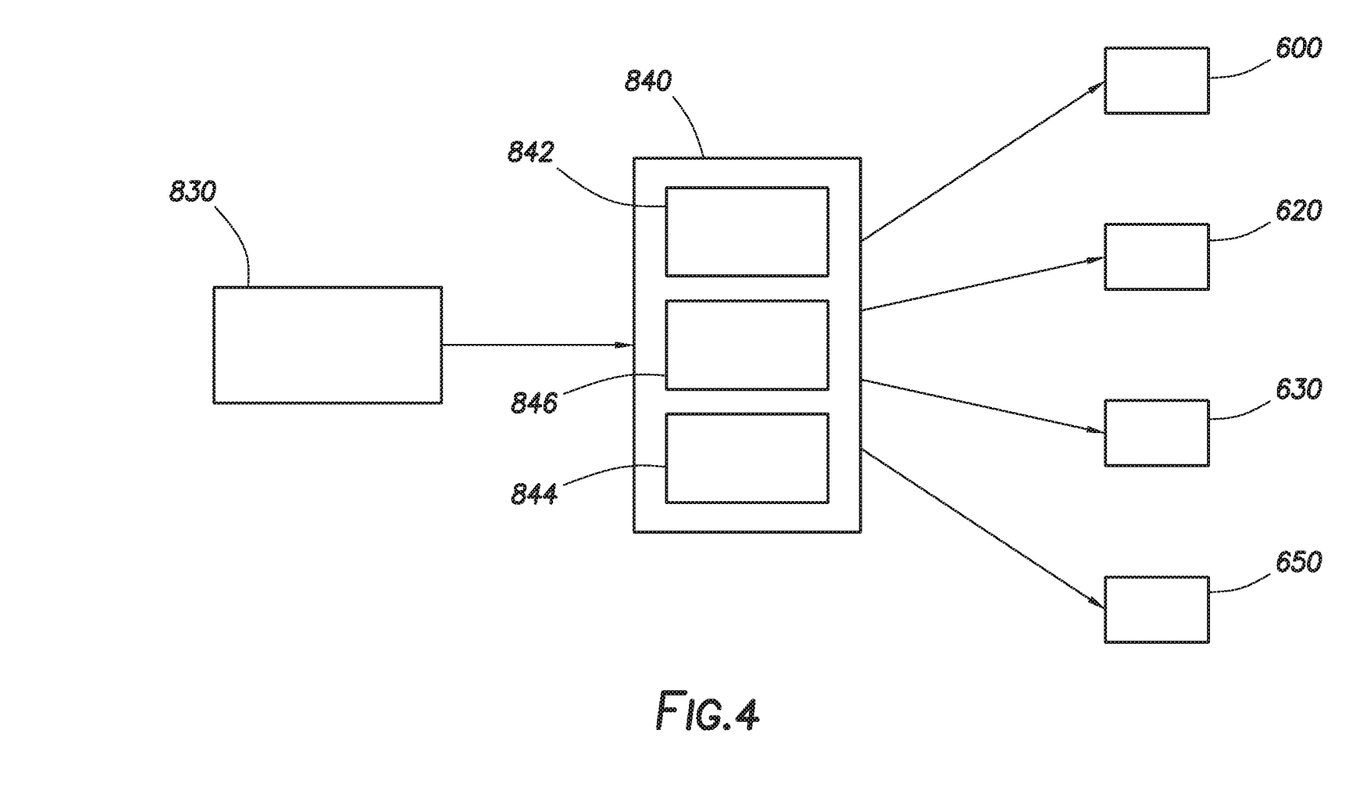
FIG. 4 is a schematic representation of a portion of a vehicle tracking and notification system consistent with certain embodiments of the present disclosure.

As shown in FIG. 4, computer system 840 may be in data communication with RFID reader 830. RFID reader 830 may communicate with computer system 840 wirelessly, via a local area network (LAN) or a wide area network (WAN), such as the internet. Computer system 840 may include database 842. While described as a single database, one of ordinary skill in the art with the benefit of this disclosure will recognize that database 842 may be a series of interconnected databases. Database 842 may correlate RFID tag information for a vehicle to a unique identifier for the vehicle, such as, without limitation, the vehicle's vehicle identification number (VIN). Database 842 may associate the VIN for the vehicle with customer information, such as, without limitation, customer name, customer address, prior contacts between vehicle service facility 100 and the customer, vehicle information, such as without limitation, make and model, and vehicle service record. In other embodiments, the VIN may be associated with a loaner vehicle.

Figure 6:
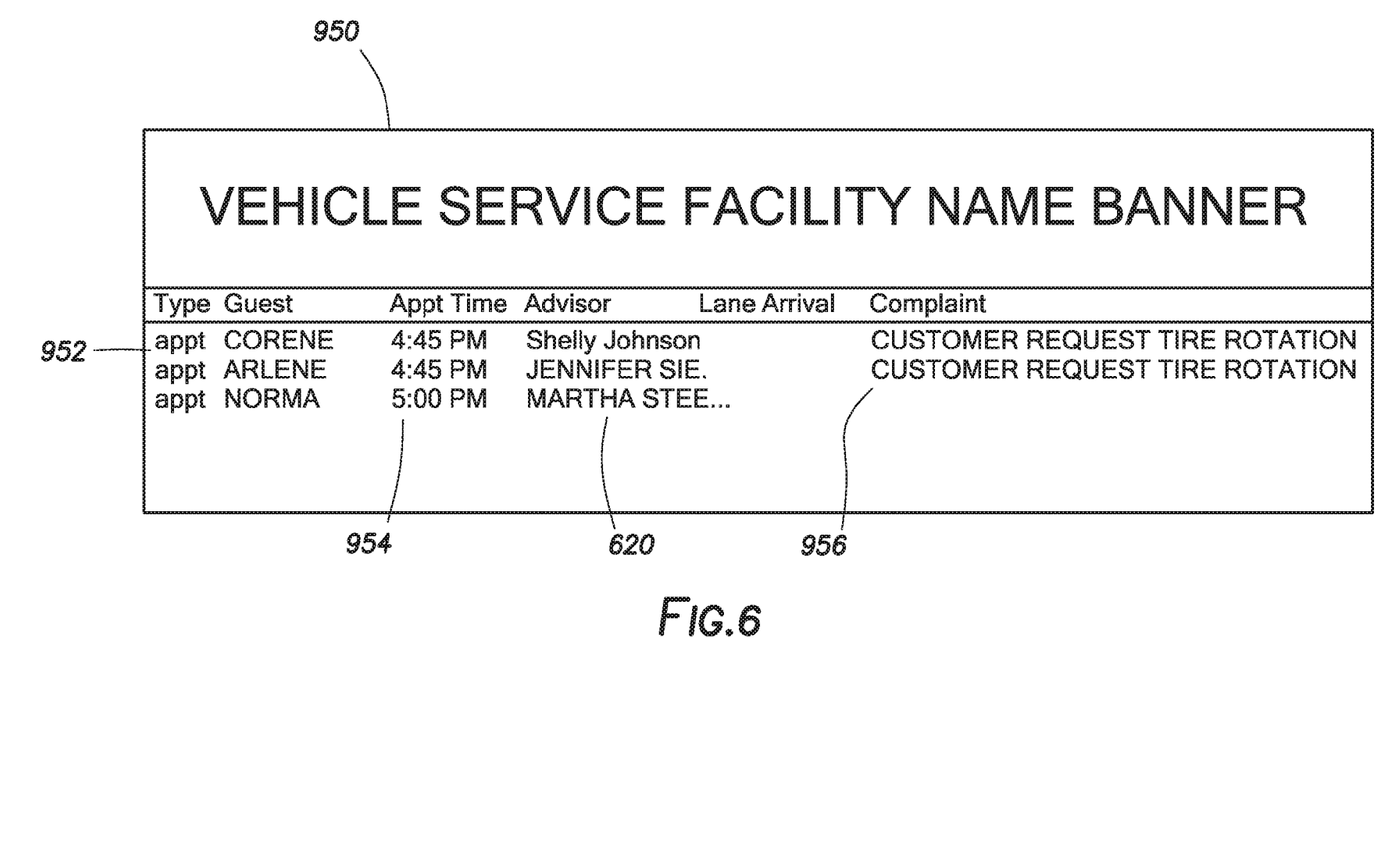
FIG. 6 is a screen shot of an appointment schedule consistent with certain embodiments of the present disclosure.

Database 842 may also include an appointment schedule. The appointment schedule may include the date and time when a customer has been assigned to arrive at vehicle intake bay 200. The appointment schedule may be displayed on a monitor. An example of an appointment schedule is depicted as appointment schedule 950 in FIG. 6. Appointment schedule 950 includes customer name 952, appointment time 954, service advisor 620, and complaint or appointment reason 956. Appointment schedule 950 may further include type of appointment, lane of vehicle intake bay 200, vehicle year, make & model, and license plate of the vehicle.

Computer system 840 may also include communications module 844. Communications module 844 may be adapted to communicate information regarding the location of the vehicle within vehicle service facility 100 to vehicle service facility personnel, such as cashier 600, one or more service advisors 620, and one or more porters 630, or to customers 650. Communications from communications module 844 may be made wirelessly, via an LAN or WAN, for instance, the internet. Communications module 844 may communicate, for instance by email, text, or pop-up message, to a monitor, or to an internet webpage.

Figure 5:
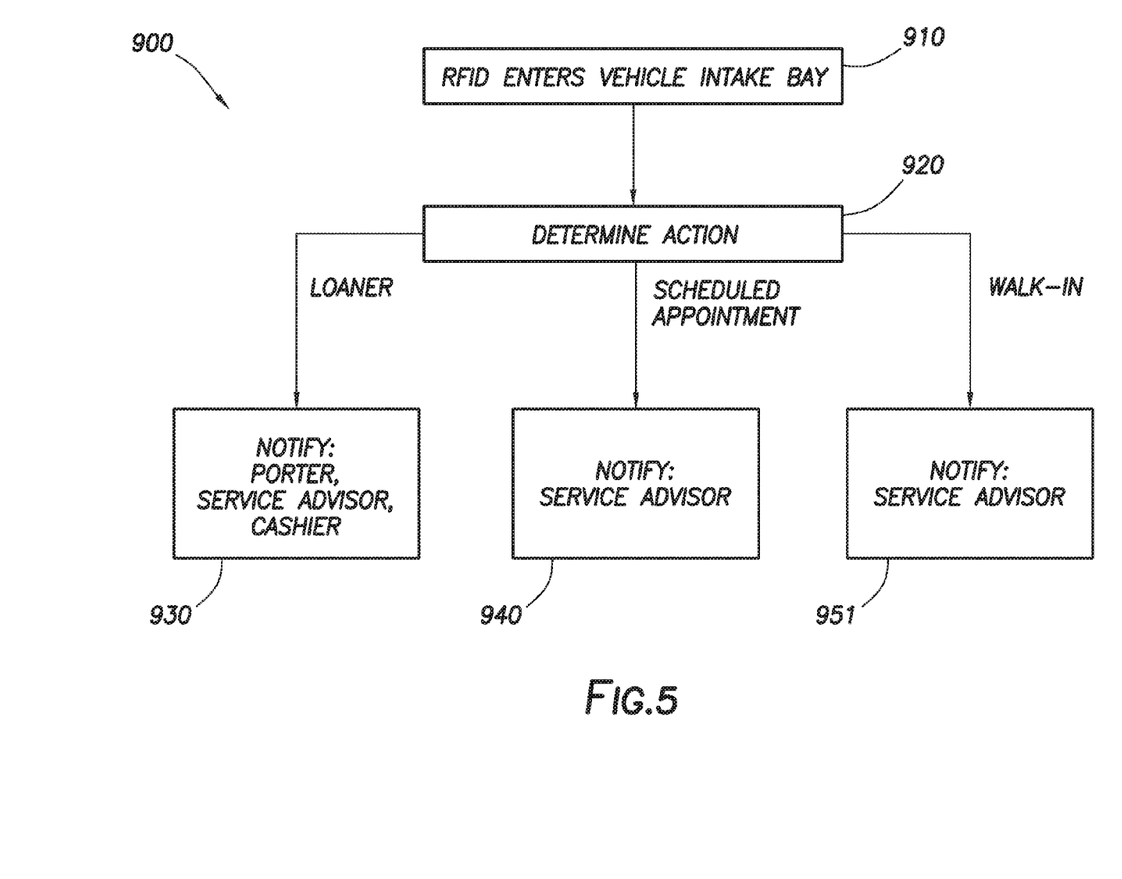
FIG. 5 is a flowchart representation of a vehicle intake process consistent with certain embodiments of the present disclosure.

FIG. 5 depicts vehicle intake process 900. When RFID tag 710 enters vehicle intake bay (RFID enters vehicle intake bay 910), vehicle intake bay entry antenna 820*a* detects RFID tag 710 and communicates the RFID tag information to RFID reader 830. RFID reader 830 communicates the RFID tag information to computer system 840. Computer system 840 determines in determine action 920 whether RFID tag 710 is associated with a loaner vehicle, a vehicle with a scheduled appointment, or a vehicle associated with a walk-in customer. If RFID tag 710 is associated with a loaner vehicle, computer system 840 executes loaner vehicle notification 930. In the embodiment depicted in FIG. 5, in loaner vehicle notification 930, computer system 840 may notify porter 630 to remove the vehicle from vehicle intake bay 200. In certain embodiments, the customer who returns the loaner vehicle is a customer whose customer vehicle has been serviced by vehicle service facility 100. If the customer vehicle has a service advisor 620 associated with the customer vehicle, service advisor 620 is notified by computer system 840 that the customer has arrived to pick up the serviced customer vehicle. In certain embodiments, cashier 600 is notified that the customer associated with a serviced customer vehicle has arrived. Cashier 600 may prepare the invoice for the customer associated with the serviced customer vehicle.

With further attention to FIG. 5, if RFID tag 710 is associated with a scheduled appointment for service, computer system 840 executes scheduled appointment notification 940. In the embodiment depicted in FIG. 5, in scheduled appointment notification 940, computer system 840 may notify service advisor 620 associated with the scheduled appointment that the customer has arrived with the customer vehicle for service. In certain embodiments, database 842 may relate RFID tag information to a VIP customer. Service advisor may be notified by computer system 840 that the VIP customer has arrived.

If RFID tag 710 is associated with a walk-in customer, that is a customer without an appointment, computer system 840 may notify service advisor 620 that a walk-in customer has arrived (walk-in customer notification 951). If the walk-in customer does not have an associated service advisor 620, computer system 840 notifies an available service advisor 620. "Available service advisor" refers to a service advisor who is determined by computer system 840 to be present at vehicle service facility 100, such as by stored schedule of service advisors 620. In certain embodiments, available service advisor 620 is a default service advisor, i.e., a service advisor assigned to walk-in customers. In those embodiments, if the default advisor is determined to be occupied, service advisor 620 is assigned on a "round robin" basis, i.e., service advisor 620 is selected by computer system 840 based on the last service advisor 620 selected for a walk-in. In other embodiments, available service advisor 620 may be assigned based on the previous service advisor assigned to the customer. If the previous advisor is occupied, the default advisor is assigned. If the default advisor is occupied, service advisor 620 is assigned on a round-robin basis. In yet another embodiment, available service advisor 620 may be assigned based on the previous service advisor assigned to the customer. If the previous service advisor is occupied, service advisor 620 may be assigned on a round-robin basis. In yet other embodiments, all service advisors are notified of the walk-in customer. Available service advisor is assigned to the default advisor. If the default advisor is occupied, the first available advisor is assigned. In certain embodiments, walk-in appointments may be manually assigned.

Notification of porter 630, service advisors 620, cashier 600 or any other vehicle service facility 100 may be made by such non-limiting methods as texts, instant messages, emails, or through a wired or wired network system to a cellphone application or to a computer such as a laptop or desktop computer.

Figure 7:
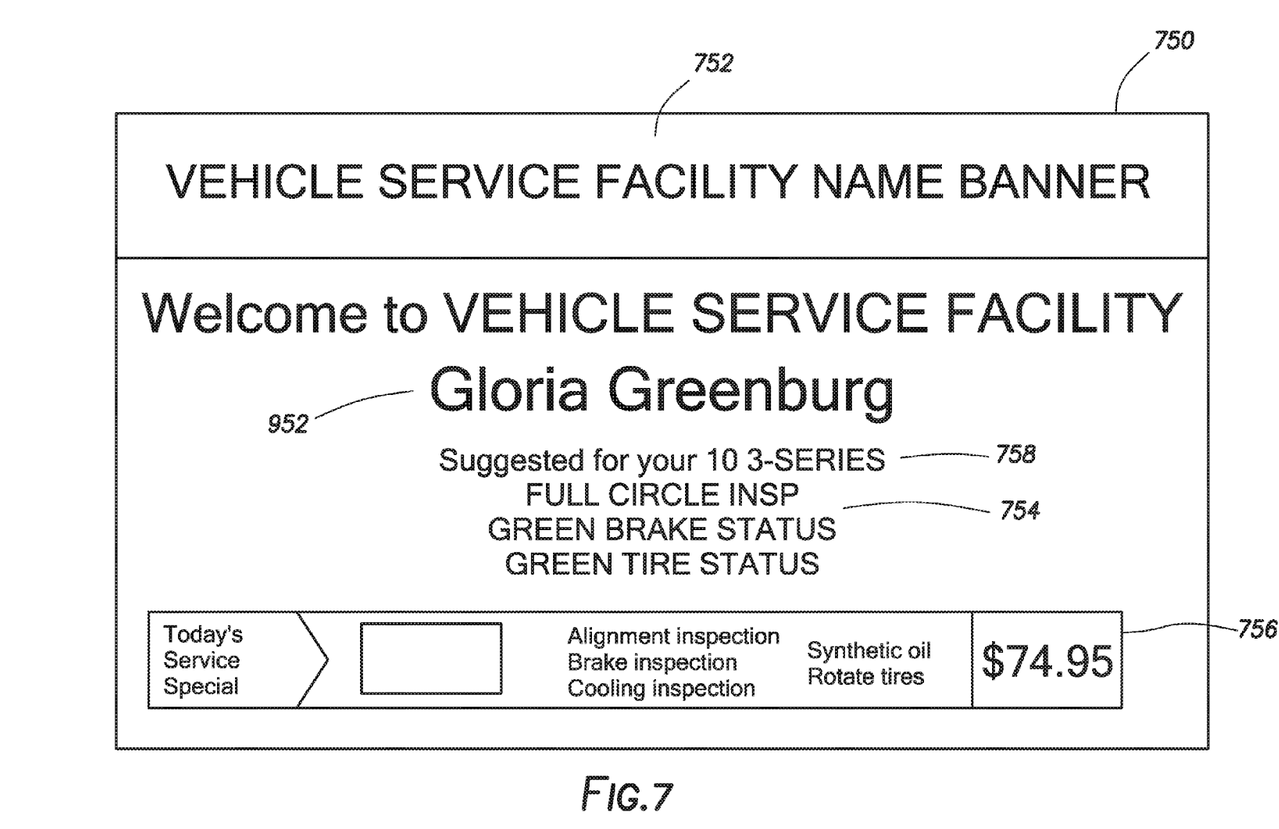
FIG. 7 is a screen shot of a greeting screen consistent with certain embodiments of the present disclosure.

When RFID tag 710 is associated with a scheduled appointment or a walk-in customer, greeting screen 750, as shown in FIGS. 1 and 7, may be displayed for viewing by the customer in vehicle intake bay 200 on a monitor, for example. Greeting screen 750 may include customer name 952, vehicle service facility name banner 752, service recommendations 754, advertisement banner 756, vehicle year and model 758 or combinations thereof. In certain embodiments, vehicle service facility name banner 752, service recommendations 754, advertisement banner 756 and/or vehicle year and model 758 may be omitted. In certain embodiments, customer name 952 may be limited to the first name of the customer, the last name of the customer, the initial of the customer's first name and full last name, or the customer's first name and initial of the customer's last name. In certain embodiments, greeting screen 750 may only be displayed for customers with appointments. In certain embodiments, greeting screen 750 may include the name of service advisor 620. In other embodiments, greeting screen 750 may include the picture or the picture and name of service advisor 620.

Figure 8:
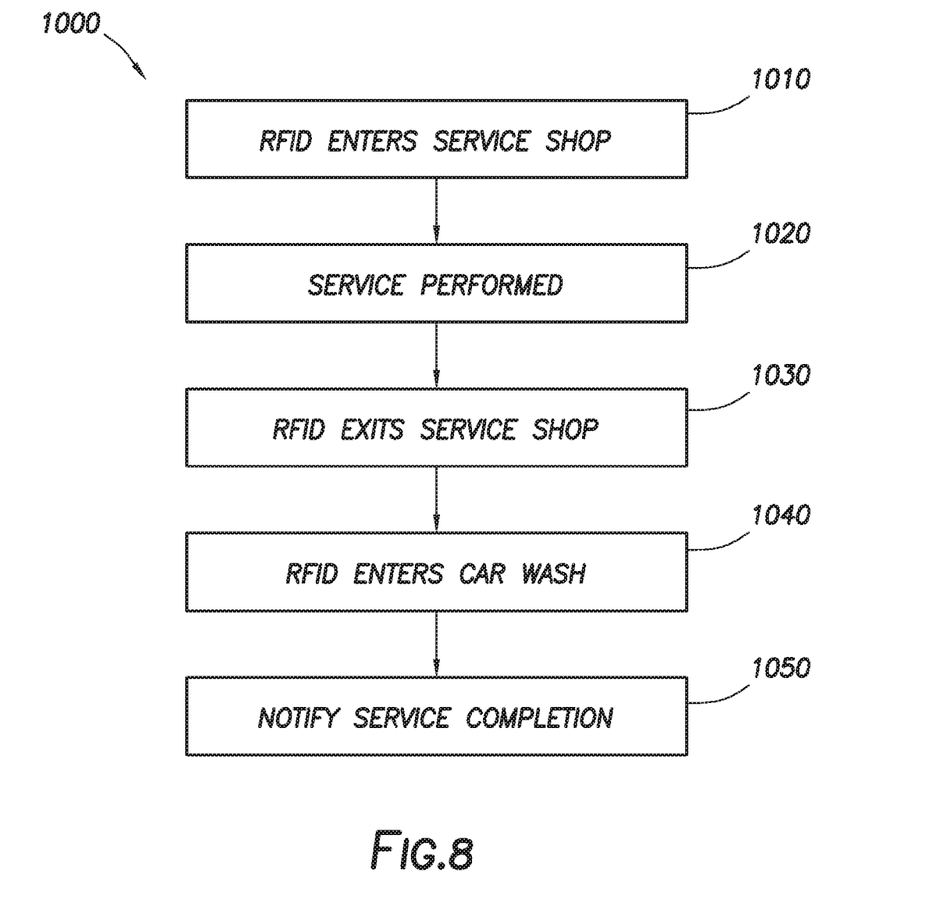
FIGS. 8, 8A, 8B, and 8C are flowchart representations of vehicle service processes consistent with certain embodiments of the present disclosure.

FIG. 8 depicts vehicle service process 1000. When RFID tag 710 is associated with a scheduled appointment or walk-in customer, the vehicle may be transported to service shop 300. In certain embodiments, when RFID tag 710 enters service shop 300 (RFID enters service shop 1010), service shop entry antenna 820*c* detects RFID tag 710 and communicates the RFID tag information to RFID reader 830. RFID reader 830 communicates the RFID tag information to computer system 840.

While in service shop 300, the service is performed (service performed 1020). Upon completion of the service, the vehicle may be transported out of service shop 300, for instance, to perform a test drive. In certain embodiments, such as shown in FIG. 8, when the RFID tag 710 exits service shop 300, service shop exit antenna 820*d* detects RFID tag 170 and communicates the RFID tag information to RFID reader 830 (RFID Exits Service Shop 1030). RFID reader 830 may communicate the RFID tag information to computer system 840. In other embodiments, where service shop exit antenna 820*d* is omitted, RFID tag information is not communicated to RFID reader 830 when the vehicle is transported out of service shop 300.

Figure 8A:
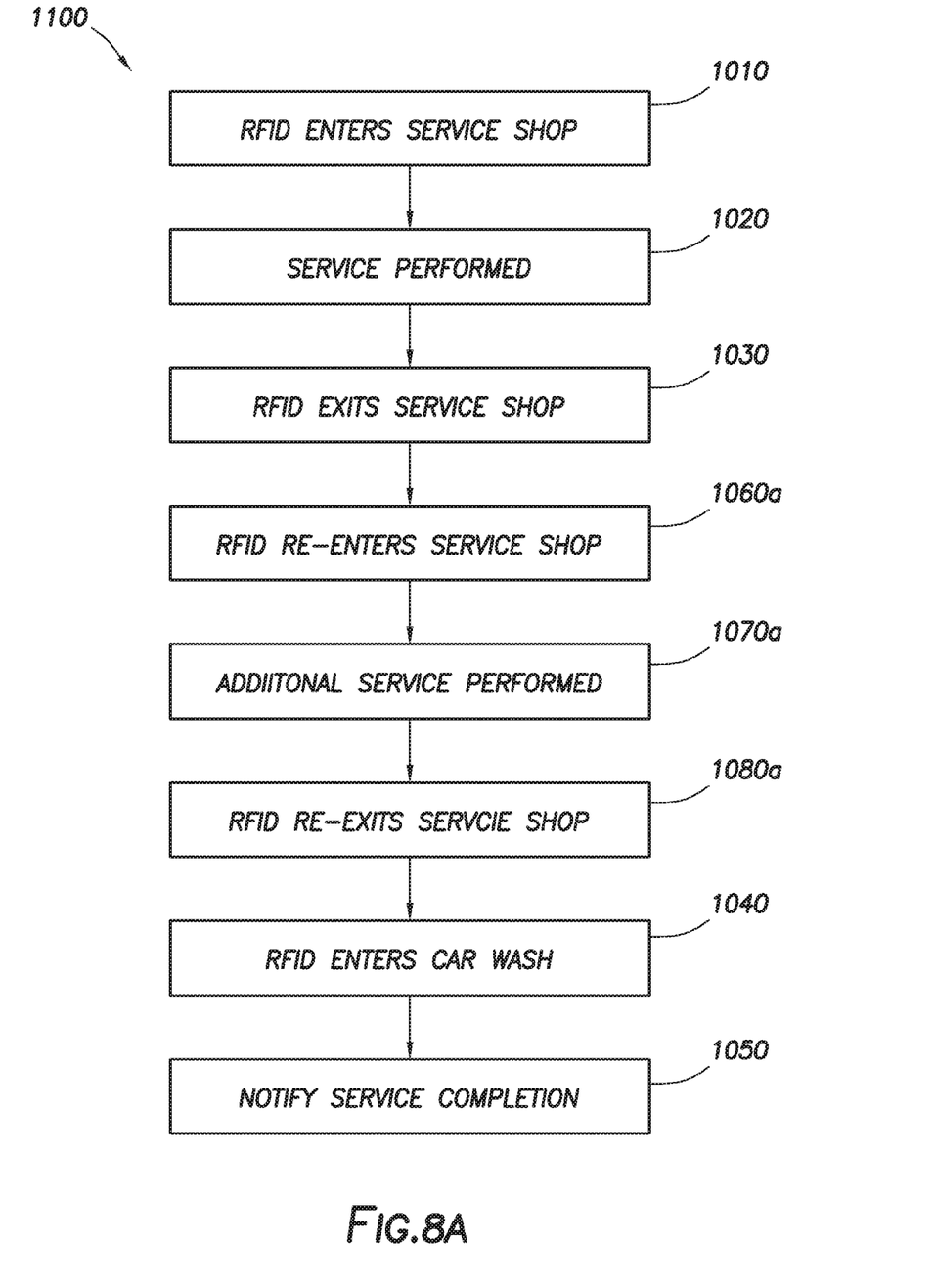

In certain embodiments, for instance, during a test drive, after a vehicle leaves service shop 300, a vehicle service shop employee such as a technician may determine that the concern (as described herein below) has not been remedied by service performed 1020. In some embodiments, this determination may be made by the technician as part of a test drive. As shown in FIG. 8A, vehicle service process 1100 includes additional service work to remedy the concern. After RFID Exits Service Shop 1030, a test drive or other diagnostic procedure may be performed by, for example, a technician. If the test drive or other diagnostic procedure indicates that the concern has not been remedied, the vehicle may be transported to service shop 300. In certain embodiments, when RFID tag 710 enters service shop 300 (RFID Re-Enters service shop 1060*a*), service shop entry antenna 820*c* detects RFID tag 710 and communicates the RFID tag information to RFID reader 830. RFID reader 830 communicates the RFID tag information to computer system 840.

While in service shop 300, additional service may be performed (additional service performed 1070*a*) to remedy the concern. Upon completion of the additional service, the vehicle may be transported out of service shop 300, for instance, to perform a second test drive or other diagnostic procedure. In certain embodiments, such as shown in FIG. 8A, when the RFID tag 710 re-exits service shop 300, service shop exit antenna 820*d* detects RFID tag 710 and communicates the RFID tag information to RFID reader 830 (RFID Re-Exits Service Shop 1080*a*). RFID reader 830 may communicate the RFID tag information to computer system 840. In other embodiments, where service shop exit antenna 820*d* is omitted, RFID tag information is not communicated to RFID reader 830 when the vehicle is transported out of service shop 300.

As one of ordinary skill in the art will appreciate, additional service performed 1070*a* may not remedy the concern. In certain embodiments, RFID Re-Enters Service Shop 1060*a*, Additional Service Performed 1070*a*, and RFID RE-Exits Service Shop 1080*a* may be repeated until the concern is remedied or it is determined that the concern cannot be remedied.

Figure 8B:
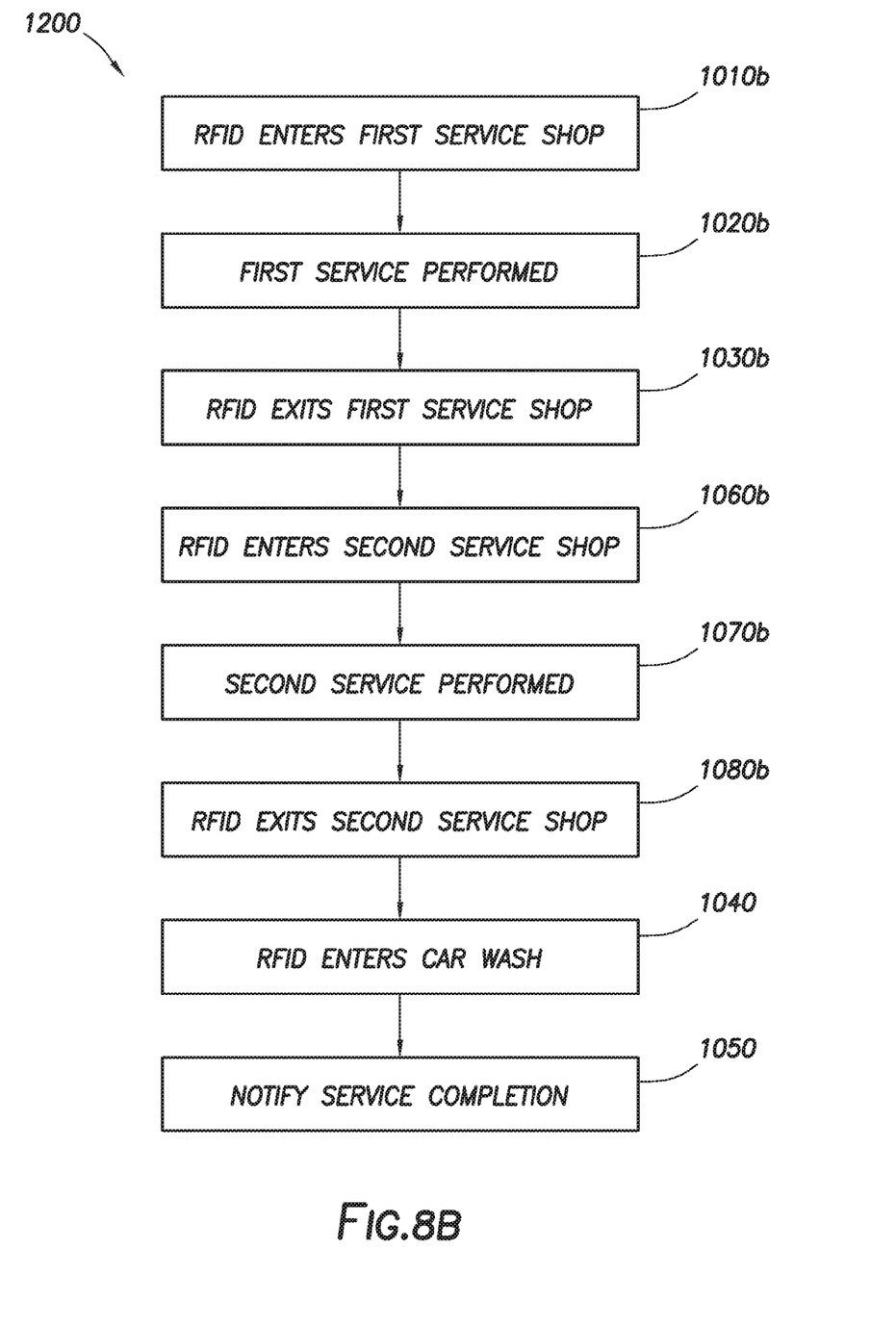

FIG. 8B depicts vehicle service process 1200. In certain embodiments, vehicle service facility 100 may include a plurality of service shops 300. In some embodiments, different services may be performed in different service shops 300. In vehicle service process 1200, service is performed in two different service shops 300 on a customer vehicle. In vehicle service process 1200, when RFID tag 710 enters first service shop 300 (RFID enters first service shop 1010*b*), first service shop entry antenna 820*c* detects RFID tag 710 and communicates the RFID tag information to RFID reader 830. RFID reader 830 communicates the RFID tag information to computer system 840.

While in first service shop 300, the first service is performed (first service performed 1020*b*). Upon completion of the first service, the vehicle may be transported out of first service shop 300 to second service shop 300. In certain embodiments, such as shown in FIG. 8B, when the RFID tag 710 exits first service shop 300, first service shop exit antenna 820*d* detects RFID tag 710 and communicates the RFID tag information to RFID reader 830 (RFID Exits First Service Shop 1030*b*). RFID reader 830 may communicate the RFID tag information to computer system 840. In other embodiments, where first service shop exit antenna 820*d* is omitted, RFID tag information is not communicated to RFID reader 830 when the vehicle is transported out of first service shop 300.

When RFID tag 710 enters second service shop 300 (RFID enters second service shop 1060*b*), first service shop entry antenna 820*c* detects RFID tag 710 and communicates the RFID tag information to RFID reader 830. RFID reader 830 communicates the RFID tag information to computer system 840.

While in second service shop 300, the second service is performed (second service performed 1070*b*). Upon completion of the second service, the vehicle may be transported out of second service shop 300. In certain embodiments, such as shown in FIG. 8B, when the RFID tag 710 exits second service shop 300, second service shop exit antenna 820*d* detects RFID tag 710 and communicates the RFID tag information to RFID reader 830 (RFID Exits Second Service Shop 1080*b*). RFID reader 830 may communicate the RFID tag information to computer system 840. In other embodiments, where second service shop exit antenna 820*d* is omitted, RFID tag information is not communicated to RFID reader 830 when the vehicle is transported out of second service shop 300.

One of ordinary skill in the art will recognize with the benefit of this disclosure that vehicle service facility 100 may include more than two service shops 300. In such embodiments, RFID Enters Second Service Shop 1060*b*, Second Service Performed 1070*b*, and RFID Exits Second Service Shop 1080*b* may be repeated for additional service shops 300.

Figure 8C:
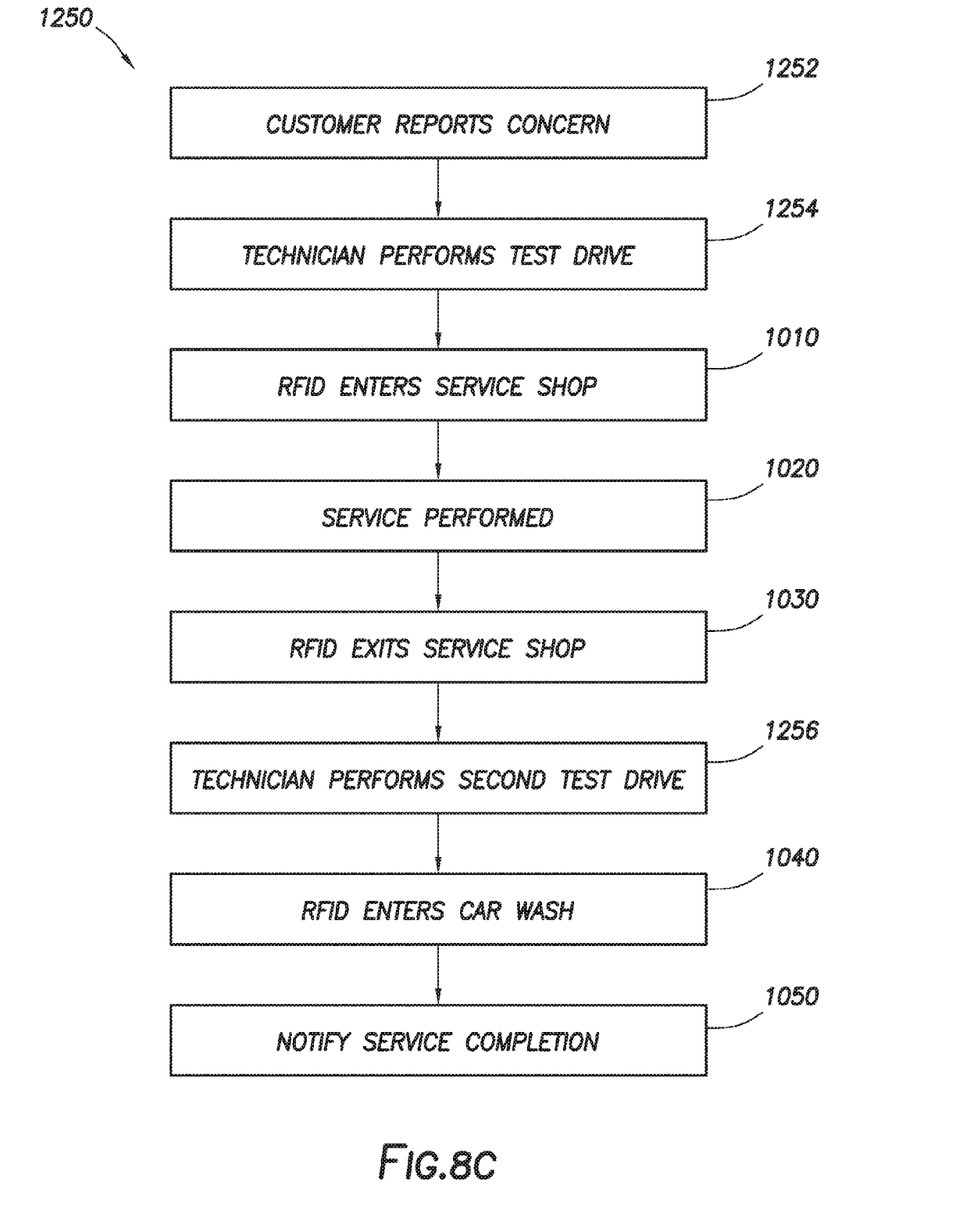

FIG. 8C depicts vehicle service process 1250. In vehicle service process 1250, a customer may report a concern, such as a deficiency in car performance, a noise, or other vehicle maintenance issue (customer reports concern 1252). In the embodiment depicted in FIG. 8C, the technician may perform a test drive to determine the source of the customer concern (technician performs test drive 1254). After service is performed (service performed 1020) and the RFID Exits Service Shop 1030, the technician may perform a second test drive (Technician Preforms $2^{nd}$ Test Drive 1256) to determine if the service performed has remedied the customer's concern.

In embodiments where vehicle service facility 100 includes car wash 500, after vehicle service is completed, vehicle service process 1000, 1100, 1200, and 1250 may further include washing a customer's vehicle prior to returning the vehicle to the customer. In certain embodiments, when RFID tag 710 enters car wash 500 (RFID enters car wash 1040), car wash entry antenna 820*g* detects RFID tag 710 and communicates the RFID tag information to RFID reader 830. RFID reader 830 communicates the RFID tag information to computer system 840. In certain embodiments, upon completion of the car wash, when RFID tag 710 exits car wash 500, car wash exit antenna 820*h* detects RFID tag 710 and communicates the RFID tag information to RFID reader 830. RFID reader 830 may communicate the RFID tag information to computer system 840. In other embodiments, where car wash exit antenna 820*h* is omitted (such as the embodiment depicted in FIG. 8), RFID tag information is not communicated to RFID reader 830 when the vehicle is transported out of car wash 500.

With further attention to FIGS. 8, 8A, 8B, and 8C, in certain embodiments, when RFID tag 710 enters car wash 500 (RFID enters car wash 1040), computer system 840 may perform notify service completion 1050, i.e., computer system 840 may notify vehicle service facility employees, for example, service advisor 620 and/or cashier 600 that the service of the vehicle is completed.

In certain embodiments, such as the embodiment depicted in FIG. 1, one or more vehicle lots (shown in FIG. 1 as first vehicle lot 400 and second vehicle lot 450) may be used to temporarily store vehicles when, for instance, service shop 300 or car wash 500 are not available for performing service or washing vehicles, respectively, when a customer is located on the premises of vehicle service facility 100, or when a loaner vehicle is stored for later use. When RFID tag 710 is detected by first vehicle lot entry antenna 820*e* or second vehicle lot entry antenna 820*f*, computer system 840 may store the location of RFID tag 710. When the vehicle associated with RFID tag 710 is wanted, such as when service shop 300 is available, car wash 500 is available, or the customer arrives at the premises of vehicle service facility 100, a vehicle service facility employee, such as porter 630, may query database 842 of computer system 840 for the location of the vehicle. Porter 630 may then transport the vehicle from first vehicle lot 400 or second vehicle lot 450 to a desired location.

Figure 9:
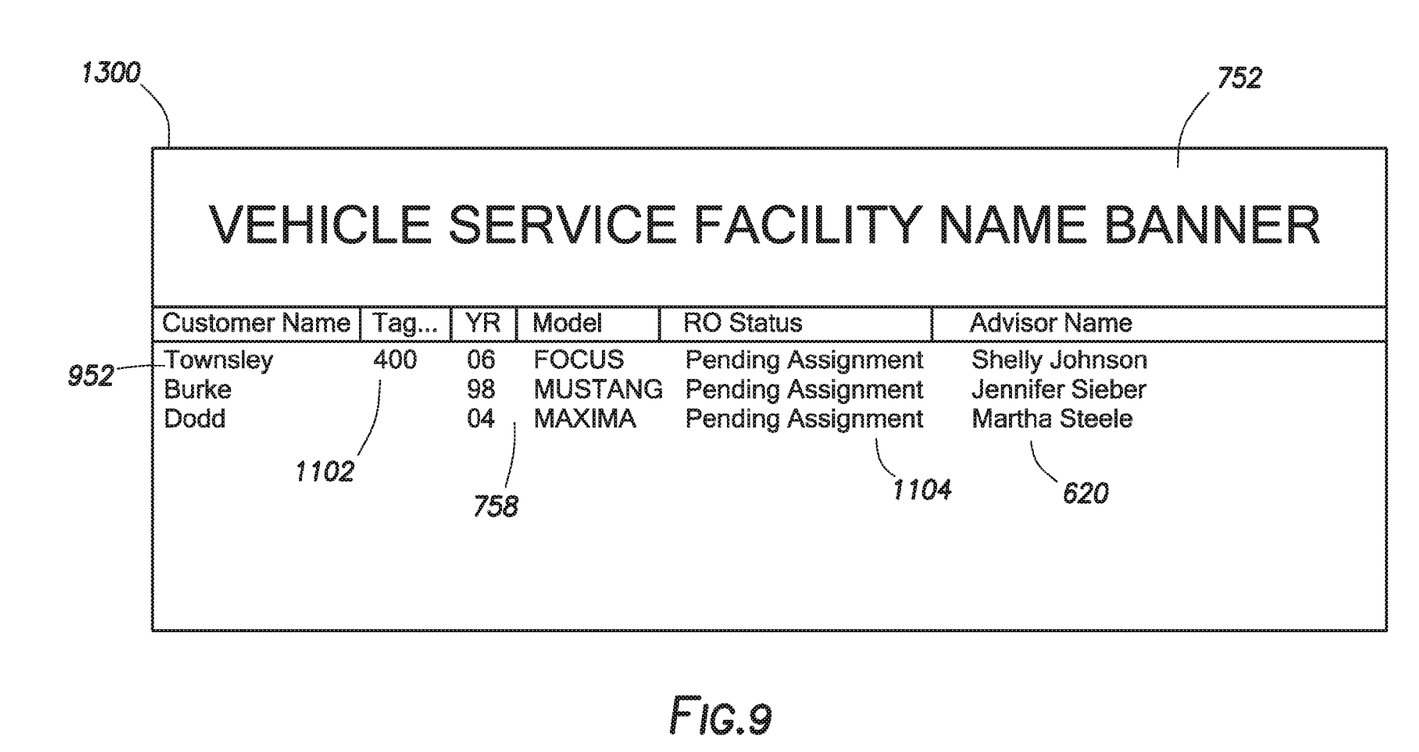
FIG. 9 is a screen shot of a status board consistent with certain embodiments of the present disclosure.

In certain embodiments, vehicle service facility 100 may include one or more status boards. A non-limiting example of a status board is depicted in FIG. 9 as status board 1300. Status board 1300 may depict the status of a customer vehicle as the customer vehicle is transported through vehicle service facility 100. Status boards 1300 may be located, for example and without limitation, in waiting room 640, with service advisors 620, in vehicle intake bay 200, in service shop 300, or combinations thereof. In certain embodiments, in addition to status boards, customers may be notified as to status through such methods as instant messages, texts, emails, or through a cellphone application.

As shown in FIG. 9, status board 1300 may display vehicle service facility name banner 752, customer name 952, vehicle year and model 758, RFID tag number 1102, repair order status 1104 (hereinafter "RO status"), service advisor 620, concern for which the customer brought the vehicle to vehicle service facility 100 (hereinafter "concern"), repair order number, arrival time at vehicle intake bay 200, make of vehicle, repair order added time (the time at which the repair order was added to computer system 840), and combinations thereof. In certain embodiments, status board 1300 may display videos for services offered by vehicle service facility 100.

RO status may be determined by computer system 840 based on the RFID tag information communicated to RFID reader 830, by vehicle service facility employees, or a combination thereof. Examples of RO statuses include, but are not limited to pending assignment, working, cold start (testing of the vehicle is to be performed when the engine of the car is cold, i.e., not recently operated), hold for parts, hold for authorization, hold for other, deleted, finished, cashier, invoiced, reserved, service advisor, customer pickup, technician assigned, timestamp, and review. For example, for a walk-in customer, after vehicle intake bay entry antenna 820a has communicated to computer system 840, that RFID tag 710 has entered vehicle bay intake bay 200, but before service advisor 620 has been assigned by computer system 840, RO status 1104 may indicate "pending assignment." In another example, after service shop entry antenna 820c has communicated to computer system 840 that RFID tag 710 has entered service shop 300, RO status may indicate "working." In yet another example, a vehicle service facility employee, such as a service shop 300 technician may communicate through a computer entry device, including, for instance, RFID reader 830, keyboard, mouse, or other device, that the service is awaiting delivery of a part ("hold for parts"), that the customer must approve further service work on the vehicle ("hold for authorization"), that work is being held for reasons other than delivery of a part of customer approval ("hold for other"), or that the service work is being terminated ("deleted"). Other examples where a vehicle service facility employee may communicate an RO status through a computer entry device include "cashier," "invoiced," "reserved," "service advisor," "customer pickup," and "review." An RO status of "timestamp" or "finished" may be communicated by a computer entry device or may be based on detection of RFID tag 710 at one or more antennas 820. In yet other examples, before or after RFID tag 710 has entered service shop 300, a technician may be assigned to the service of the vehicle by computer system 840 or manually, resulting in a status of "technician assigned."

Different status boards 1300 may display different information. For example, status board 1300 in with service advisors 620 may display RFID tag number, which may be omitted from status board 1300 in waiting room 640. As one of ordinary skill in the art with the benefit of this disclosure will recognize, vehicle service facility name banner 752, customer name 952, vehicle year and model 758, RFID tag number 1102, RO status 1104, service advisor 620, concern for which the customer brought the vehicle to vehicle service facility 100 (hereinafter "concern"), repair order number, arrival time at vehicle intake bay 200, make of vehicle, or repair order added time may be omitted or included in individual status board 1300 displays.

In certain embodiments, computer system 840 may include service history database 846. Service history database 846 may store and make available for retrieval data obtained from RFID antennas 820. For example, service history database 846 may include service history data regarding which RFID antennas 820 received a signal from RFID tag 710 and at what time. In some embodiments, computer system 840 may present a report containing services history data. Computer system 840 may also present exception reports. Exception reports may indicate when an expected step failed to occur, such as car if wash entry antenna 820g detected RFID tag 710, but car wash exit antenna 820h did not detect RFID tag 710. Another non-limiting example of an exception report may be that although the vehicle was expected to use car wash 500, but no data is present that RFID tag 710 entered or exited car wash 500.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
   providing a vehicle service facility, the vehicle service facility comprising:
   an RFID transmitter-receiver, the RFID transmitter-receiver comprising at least one RFID antenna and an RFID reader, the at least one RFID antenna being a vehicle intake bay antenna;
   a computer system, the computer system having a programmable processor and processor-readable or computer-readable programming code embodying logic embedded on tangible, non-transitory computer readable media, the computer system in data communication with the RFID reader;
   a vehicle intake bay;
   a greeting screen, the greeting screen located within the vehicle intake bay, the greeting screen positioned to be viewed by a customer, the greeting screen adapted to display a customer name, the vehicle service facility name banner; an advertisement banner; a vehicle year and model, or a combination thereof; and a service shop;

detecting an RFID tag with the vehicle intake bay entry antenna;

determining whether the RFID tag is associated with a loaner vehicle;

determining whether the RFID tag is associated with a vehicle having a scheduled appointment;

determining whether the RFID tag is associated with a vehicle associated with a walk-in customer; and displaying a customer name on a greeting screen only for customers having a scheduled appointment.

2. The method of claim 1 further comprising displaying the name of the service advisor on the greeting screen.

3. The method of claim 2 further comprising displaying a picture of the service advisor on the greeting screen.

4. The method of claim 1, wherein the RFID tag is associated with a vehicle having a scheduled appointment or a vehicle associated with a walk-in customer, the method further comprising notifying a service advisor.

5. The method of claim 4, further comprising:

detecting the RFID tag with a service shop entry antenna; and displaying an RO status on a status board.

6. The method of claim 1, wherein the greeting screen further includes a vehicle service facility name banner, an advertisement banner, a vehicle year and model, a service advisor name, or combinations thereof.

7. The method of claim 6, wherein the greeting screen further displays a service suggestion.

8. The method of claim 6, wherein if the customer is a walk-in customer, assigning a service advisor, wherein the service advisor is a default service advisor or a service advisor assigned on a round robin basis.

9. The method of claim 1, wherein the RFID tag is associated with a loaner vehicle, the method further comprising:

notifying a porter;

notifying a service advisor; and notifying a cashier.

10. The method of claim 5, further comprising displaying on the status board a vehicle service facility name banner, a customer name, a vehicle year and model, an RFID tag number, a service advisor, a concern, a repair order number, an arrival time at the vehicle intake bay, a make of vehicle, a repair order added time, or combinations thereof.

11. The method of claim 5, wherein the RO status is pending assignment, working, cold start, hold for parts, hold for authorization, hold for other, deleted, cashier, invoiced, reserved, service advisor, customer pickup, technician assigned, timestamp, or review.

12. The method of claim 5, further comprising:

detecting the RFID tag with a car wash entry antenna; and notifying a service advisor of service completion.

13. The method of claim 1, wherein the customer name consists of the customer first name and the first initial of the customer last name.

* * * * *